No. 810,559.  
PATENTED JAN. 23, 1906.

J. V. O. PALM.  
DUST COLLECTOR.  
APPLICATION FILED MAY 17, 1905.

Witnesses.  
Inventor:  
John V. O. Palm  
By Benedict & Morsell  
Attorneys.

UNITED STATES PATENT OFFICE.

JOHN V. O. PALM, OF MILWAUKEE, WISCONSIN, ASSIGNOR TO THE AMERICAN COMPRESSED AIR SUPPLYING COMPANY, OF MILWAUKEE, WISCONSIN, A CORPORATION OF WISCONSIN.

DUST-COLLECTOR.

No. 810,559.  Specification of Letters Patent.  Patented Jan. 23, 1906.

Application filed May 17, 1905. Serial No. 260,790.

*To all whom it may concern:*

Be it known that I, JOHN V. O. PALM, residing in Milwaukee, in the county of Milwaukee and State of Wisconsin, have invented new and useful Improvements in Dust-Collectors, of which the following is a description, reference being had to the accompanying drawings, which are a part of this specification.

This invention relates to dust-collectors, and has for its object to provide a means for separating dust from dust-laden air which is discharged from pneumatic renovating apparatus and the like.

Another object of this invention is to provide a dust-collector with a means for restricting the passage of the air therethrough and permitting it to expand gradually within a partially-confined chamber.

Another object of this invention is to provide a dust-collector of a novel construction by which the several parts thereof may be readily taken apart and assembled for cleaning.

With the above and other objects in view the invention consists in the dust-collector, its parts and combinations of parts, as herein set forth, and their equivalents.

Figure 1:
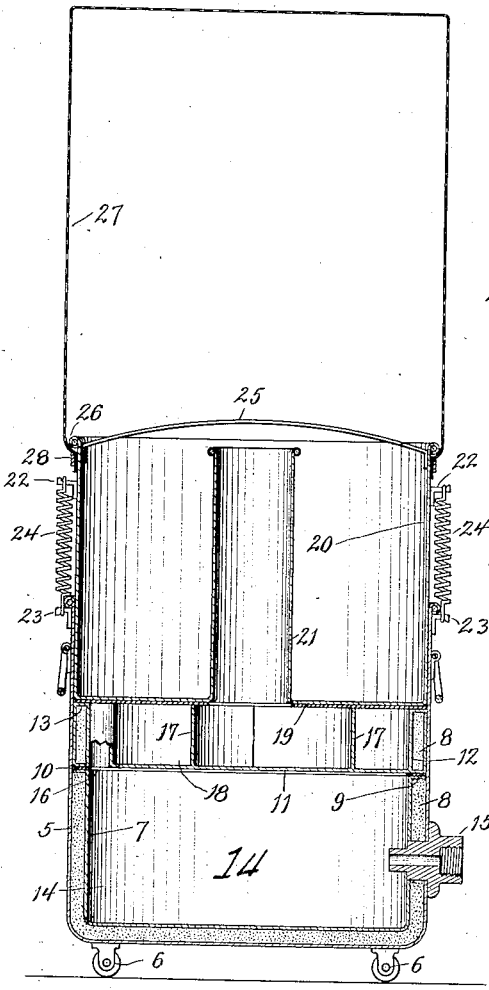
Figure 2:
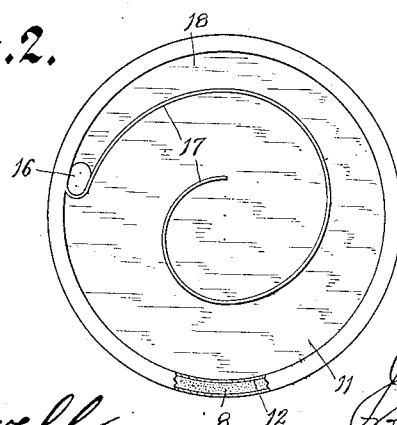

Referring to the accompanying drawings, in which like characters of reference indicate the same parts in the several views, Figure 1 is a central sectional view of a dust-collector constituting an embodiment of this invention, and Fig. 2 is a plan view of the baffle-drum thereof partly sectioned.

In these drawings, 5 represents a cylindrical casing which has a closed bottom and is mounted upon casters 6, by which it may be moved from place to place. The casing 5 is provided in its bottom with a lining 7, which is regularly spaced from the walls of casing 5 to form a surrounding jacket-space which is filled with a sound-deadening material 8, such as saw-dust and the like, the upper edge of the lining 7 being turned outwardly to fit against the inner wall of the casing 5 and constitute an annular shoulder 9 about half-way up the interior of the casing 5.

An annular gasket 10, of rubber or the like, is placed upon the annular shoulder 9, and a cylindrical baffle-drum 11 is fitted within the casing 5 with its closed bottom seated upon the gasket 10 and with an inner wall 12 spaced from its outer wall to form a continuation of the surrounding jacket-space of the casing 5, which is likewise filled with the saw-dust 8 and is closed at its upper edge to constitute an annular shoulder 13. An air-expansion chamber 14 is formed in the bottom of the casing 5, which is surrounded by the sound-deadening jacket and is closed by the baffle-drum 11. A pipe-coupling 15 is fitted through the walls of this expansion-chamber 14 and is adapted to have some portion of a pneumatic renovating apparatus connected thereto, so as to discharge dust-laden air through the coupling 15 into the chamber 14. The baffle-drum 11 has a small opening 16 in its bottom portion, preferably located near its edge opposite the pipe-coupling 15, and a spirally-curved baffle-plate 17 forms an upstanding wall of the same height as the sides of the baffle-drum to partition off in connection therewith a spirally-curved passage-way 18, which starts from the opening 16 and gradually widens as it approaches the center of the baffle-drum.

A disk or gasket 19, of leather or the like material, is placed upon the upper end of the baffle-drum 11, bearing upon the annular shoulder 13 and the baffle-plate 17 throughout its length, so as to close the spirally-curved passage-way 18 except at the middle portion of the gasket 19, which has a circular opening therethrough for the outlet of the air. A cylindrical bucket 20 is fitted in the mouth of the casing 5 and bears upon the gasket 19, and an upright tubular spout 21 passes through its bottom and registers with the opening in the gasket 19 to form an outlet-passage for the spirally-arranged passage-way 18 of the baffle-drum 11. The bucket 20 has lugs 22 extending outwardly therefrom, which are connected to lugs 23 on the casing 5 by means of coiled springs 24, serving to hold the bucket 20 seated upon the gasket 19 with pressure and pressing the gasket 19 tightly upon its support to prevent air passing therebetween. The bucket 20 is provided with a handle 25, extending thereacross, by which it may be lifted from the casing 5 after releasing the coiled springs 24. The upper end of the bucket is provided with an outwardly-turned bead 26, to which a strainer-bag 27 may be connected by means of a band 28, fitting around the mouth of said bag under the bead 26.

In operating the dust-laden air is admitted to the expansion-chamber 14 through the coupling 15 with great force, and as the opening 16 is its only outlet and said opening is too small to permit of the free passage of the air when fully expanded the air will not expand completely within the chamber 14, though its expansion here will be considerable. The partially-expanded air passes from the chamber 14 through the opening 16 and around the spirally-curved passage-way 18 of the baffle-drum 11, where it is allowed to expand more by the gradual enlargement of said passage-way until it reaches the center of the baffle-drum, when it passes upwardly through the spout 21 into the atmosphere through the strainer-bag 27. The sound produced by the rapidly-expanding air as it leaves the coupling 15 is deadened by the surrounding sound-deadening jacket of the expansion-chamber 14, and the sound-deadening jacket for the baffle-drum deadens the sound produced by the air rushing through the opening 16. The portion of the device beneath the bucket 20 is mainly for the purpose of reducing the pressure of the air, so that it may be passed through the strainer-bag 27 at a low pressure, and the dust may be entirely removed thereby. The dust collected by the strainer-bag 27 falls into the bucket 20, where it remains undisturbed until the completion of the operation, when the bucket may be removed from the casing 5, emptied, and the strainer-bag 27 may be cleaned and replaced. While it is intended that these parts beneath the bucket 20 are to be employed for reducing the air-pressure only, when dust collects therein they may be readily cleaned by removing the bucket 20 and the baffle-drum 11, and all three parts, including the casing, are then open, so that the dust may be easily emptied therefrom. The spout 21 of the bucket 20 permits of the bucket with its charge of dust being moved from place to place without losing the dust through the central opening thereof and also prevents the passage of air from the baffle-drum from disturbing the dust which has already accumulated in the bucket.

While the particular details of construction and arrangement of parts of one embodiment of the invention have been shown and described as exemplifying the invention, it is not to be understood therefrom that the invention is confined to this embodiment; but other embodiments of the invention differing from the present may be made within the scope of the invention as defined by the claims.

As before stated, the expansion-chamber 14 is for the purpose of partially reducing the pressure of the air, and this is accomplished quickly, so that besides the heavy particles of dust being deposited in said expansion-chamber the sudden change in pressure of the air will deposit the moisture thereof upon the walls of the expansion-chamber, so that it does not accompany the dust and serve to hinder the straining operation by clogging the dust in the strainer-bag.

It will be noted that this invention is not limited to the presence of the strainer-bag 27, so that the device constitutes a dust-separator, but that the main feature of the invention is its ability to exhaust air under pressure with silence and that this is principally due to the fact that the air is allowed a gradual expansion in the gradually-enlarging passage-way 18. Air under high pressure is not discharged into the atmosphere direct, for that would produce a noisy operation; but the pressure of the air being reduced gradually by its expansion in the gradually-enlarging passage-way renders its discharge into the atmosphere practically noiseless. It is obvious that the silencer as such may be independent of the dust-separator, either forming a mechanism to be used in conjunction with a separate dust-separator or to be used alone without a separator.

What I claim as my invention is—

1. In a dust-collector, an expansion-chamber in which dust-laden air under pressure may partially expand, a baffle-drum into which the air passes from the expansion-chamber, a spirally-arranged baffle-plate in the baffle-drum forming a spirally-curved passage-way of gradually-increasing size, and a strainer into which the passage-way discharges.

2. In a dust-collector, an expansion-chamber in which dust-laden air under pressure may partially expand, a baffle-drum receiving the air from the expansion-chamber, a removable bucket having a spout attached to the bottom thereof receiving the air from the baffle-drum, and a strainer connected with the bucket and adapted to deposit dust in the bucket.

3. In a dust-collector, a casing, a baffle-drum fitting therein and forming an expansion-chamber in the casing in which dust-laden air under pressure may partially expand, said baffle-drum being adapted to receive the air from the expansion-chamber, a spirally-arranged baffle-plate in the baffle-drum forming a spirally-curved passage-way increasing in size for the passage of air therethrough, a bucket fitting against the baffle-drum and closing the passage-way of the drum, a spout extending from the bottom of the bucket, adapted to receive the air from the passage-way, and a strainer connected with the bucket.

4. In a dust-collector, a casing, a shouldered lining in the casing constituting an expansion-chamber in which dust-laden air may partially expand and with the casing forming a sound-deadening jacket around the expansion-chamber, a baffle-drum seated on the shoulder of the lining receiving the air from the expansion-chamber, and a strainer into which the baffle-drum discharges.

5. In a dust-collector, a casing, a shouldered lining therefor forming an expansion-chamber in which dust-laden air under pressure may partially expand surrounded by a sound-deadening jacket, a gasket on the shoulder of the lining, a baffle-drum seated on the gasket and receiving the air from the expansion-chamber, a sound-deadening jacket for the baffle-drum, and a strainer into which the baffle-drum discharges.

6. In a dust-collector, a casing, a shouldered lining therein forming a jacketed expansion-chamber in which dust-laden air under pressure may partially expand, a baffle-drum seated on the shoulder of the lining and receiving the air from the expansion-chamber, a spirally-arranged baffle-plate in the baffle-drum forming a spirally-curved passage-way gradually increasing in size for the passage of the air, a gasket fitting on the baffle-drum and closing the passage-way except at the enlarged middle portion thereof where the gasket is provided with an opening through which the air may pass, a bucket fitting in the casing and seated on the gasket, an upwardly-extending spout passing through the bottom of the bucket and registering with the opening of the gasket, and a strainer connected with the bucket.

7. In a dust-collector, a casing having a shoulder, a baffle-drum seated on the shoulder and forming an expansion-chamber with the casing in which dust-laden air under pressure may partially expand, said baffle-drum having an opening therethrough to receive air from the expansion-chamber, a spirally-arranged baffle-plate in the baffle-drum forming a spirally-curved passage-way gradually increasing in size leading from the opening through the bottom of the baffle-drum to the middle portion thereof, a gasket seated on the baffle-drum and closing the passage-way thereof except at the middle portion where the gasket is provided with an opening through which the air may pass, a bucket fitting in the casing and seated on the gasket, a spout passing through the bottom of the bucket and registering with the opening of the gasket, a strainer on the bucket, and means for holding the bucket against the casing.

8. In a dust-collector, a casing having a shoulder, a baffle-drum seated on the shoulder and forming an expansion-chamber with the casing in which dust-laden air under pressure may partially expand, said baffle-drum having an opening therethrough to receive air from the expansion-chamber, a spirally-arranged baffle-plate in the baffle-drum forming a spirally-curved passage-way gradually increasing in size leading from the opening through the bottom of the baffle-drum to the middle portion thereof, a gasket on the baffle-drum and closing the passage-way thereof except at the middle portion where the gasket is provided with an opening through which the air may pass, a bucket fitting in the casing and seated on the gasket, a spout passing through the bottom of the bucket and registering with the opening of the gasket, a strainer on the bucket, and springs connecting the bucket with the casing to tightly clamp the gasket between the bucket and the baffle-drum.

9. In a dust-collector, a casing, a shouldered lining therein forming an expansion-chamber surrounded by a sound-deadening jacket, a filling of sound-deadening material in the space between the lining and the casing, a coupling passing through the wall of the expansion-chamber and adapted to discharge dust-laden air under pressure into said expansion-chamber, a gasket on the shoulder of the lining, a baffle-drum seated on the gasket and having an opening through its bottom to receive air from the expansion-chamber, a sound-deadening jacket surrounding the baffle-drum, sound-deadening material in said sound-deadening jacket, a spirally-arranged baffle-plate in the baffle-drum forming a spirally-curved passage-way gradually increasing in size for the passage of air therethrough from the opening in the bottom of the baffle-drum to the center thereof, a gasket fitting on the baffle-drum and baffle-plate and closing the passage-way except at its middle portion where it is provided with an opening through which the air may pass, a bucket fitting in the casing and seated on the last-named gasket, a spout passing through the bottom of the bucket and registering with the opening of the gasket to receive the air from the passage-way, springs connecting the bucket with the casing, a handle on the bucket, and a bead on the mouth of the bucket with which the mouth of a strainer-bag may be connected.

10. In a dust-collector, a bucket adapted to have a strainer-bag connected to its mouth, and a spout leading from an opening in the bottom of the bucket to admit dust-laden air thereto, said spout serving to prevent the incoming air from disturbing the dust previously collected in the bucket and also preventing the dust falling out of the bucket through the opening in the bottom thereof when the bucket is being moved from place to place.

11. In a dust-collector, a baffle-drum, a baffle-plate therein forming a passage-way gradually increasing in size, a removable cover for the baffle-drum closing the passage-way; means for supplying the passage-way with dust-laden air under pressure which may expand in the enlarging passage-way, a strainer having communication with the passage-way at its largest part, and a sound-deadening jacket surrounding the baffle-drum.

In testimony whereof I affix my signature in presence of two witnesses.

JOHN V. O. PALM.

Witnesses:
R. S. C. CALDWELL,
ANNA F. SCHMIDTBAUER.